United States Patent
Shah

(12) 
(10) Patent No.: US 6,615,295 B2
(45) Date of Patent: Sep. 2, 2003

(54) RELAXED READ COMPLETION ORDERING IN A SYSTEM USING TRANSACTION ORDER QUEUE

(75) Inventor: Paras A. Shah, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 09/749,111

(22) Filed: Dec. 26, 2000

(65) Prior Publication Data

US 2002/0083247 A1 Jun. 27, 2002

(51) Int. Cl.[7] ............... G06F 13/14; G06F 13/20
(52) U.S. Cl. ............... 710/54; 710/52; 710/56; 710/129; 709/2; 709/3
(58) Field of Search ............... 709/2, 3; 710/52, 710/54, 56, 129

(56) References Cited

U.S. PATENT DOCUMENTS

| | | | | |
|---|---|---|---|---|
| 6,076,130 A | * | 6/2000 | Sharma | 710/310 |
| 6,175,889 B1 | * | 1/2001 | Olarig | 710/309 |
| 6,219,737 B1 | * | 4/2001 | Chen et al. | 710/310 |
| 6,266,731 B1 | * | 7/2001 | Riley et al. | 710/313 |
| 6,301,630 B1 | * | 10/2001 | Chen et al. | 710/310 |

* cited by examiner

*Primary Examiner*—Rehana Perveen

(57) ABSTRACT

A technique is provided for automatically bypassing a transaction order queue for read completion transactions. The technique incorporates logic within an ASIC bridge, wherein read completion transactions are designated a relaxed ordering attribute value. Logic within the ASIC facilitates the read transactions by bypassing the transaction order queue if the relaxed ordering attribute is set accordingly. Similarly, the logic disables the attribute and enqueues the read completion transaction into the transaction order queue, if the relaxed ordering attribute is set to logical zero.

39 Claims, 4 Drawing Sheets

RELAXED READ COMPLETION ORDERING IN A SYSTEM USING TRANSACTION ORDER QUEUE

FIELD OF THE INVENTION

The present invention relates generally to the implementation of a relaxed ordering attribute in PCI-X systems. Particularly, the present invention facilitates bypassing of the transaction order queue by read completion transactions when a relaxed ordering attribute is set accordingly.

BACKGROUND OF THE RELATED ART

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art, A conventional computer system typically includes one or more central processing units (CPUs) and one or more memory subsystems. Computer systems also typically include peripheral devices for inputting and outputting data. Some common peripheral devices include, for example, monitors, keyboards, printers, modems, hard disk drives, floppy disk drives, and network controllers. The various components of computer system communicate and transfer data using various buses and other communication channels that interconnect the respective communicating components.

One of the important factors in the performance of a computer system is the speed at which the CPU operates. Generally, the faster the CPU operates, the faster the computer system can complete a designated task. One method of increasing the speed of a computer is using multiple CPUs, commonly known as multiprocessing. With multiple CPUs, tasks may be executed substantially in parallel as opposed to sequentially.

However, the addition of a faster CPU or additional CPUs can result in different increases in performance among different computer systems. Although it is the CPU that executes the algorithms required for performing a designated task, in many cases it is the peripherals that are responsible for providing data to the CPU and storing or outputting the processed data from the CPU. When a CPU attempts to read or write to a peripheral, the CPU often "sets aside" the algorithm that is currently executing and diverts to executing the read/write transaction (also referred to as an input/output transaction or an I/O transaction) for the peripheral. As can be appreciated by those skilled in the art, the length of time that the CPU is diverted is typically dependent on the efficiency of the I/O transaction.

Although a faster CPU may accelerate the execution of an algorithm, a slow or inefficient I/O transaction process associated therewith can create a bottleneck in the overall performance of the computer system. As the CPU becomes faster, the amount of time it expends executing algorithms becomes less of a limiting factor compared to the time expended in performing an I/O transaction. Accordingly, the improvement in the performance of the computer system that could theoretically result from the use of a faster CPU or the addition of additional CPUs may become substantially curtailed by the bottleneck created by the I/O transactions.

Moreover, it can be readily appreciated that any performance degradation due to such I/O bottlenecks in a single computer system may have a stifling affect on the overall performance of a computer network in which the computer system is disposed.

As CPUs have increased in speed, the logic controlling I/O transactions has evolved to accommodate I/O transactions. Such logic, usually referred to as a "bridge," is typically an application specific integrated circuit (ASIC). Thus, most I/O transactions within a computer system are now largely controlled by these ASICs. For example, Peripheral Component Interconnect (PCI) logic is instilled within buses and bridges to govern I/O transactions between peripheral devices and the CPU.

Today, PCI logic has evolved into the Peripheral Component Interconnect Extended (PCI-X) to form the architectural backbone of the computer system. PCI-X logic has features that improve upon the efficiency of communication between peripheral devices and the CPU. For instance, PCI-X technology increases bus capacity to more than eight times the conventional PCI bus bandwidth. For example, a 133 MB/s system with a 60 bit PCI bus running at 33 MHz is increased to a 1060 MB/s system with the 64 bit PCI bus running at 133 MHz.

An important feature of the new PCI-X logic is that it can provide backward compatibility with PCI enabled devices at both the adapter and system levels For example, although PCI devices cannot run in PCI-X mode, the bus is still operable in PCI mode. However, the devices will operate at the slower PCI speed and operate according to PCI specifications. Thus, PCI-X devices will operate according to PCI-X specifications, while PCI devices will operate according to PCI specifications without having an adverse affect on the PCI-X devices, if the PCI and PCI-X devices are located on separate buses.

PCI-X logic devices enable a requesting device to make only one data transaction and relinquish the bus, rather than reissuing the transaction on the bus to poll for a response. PCI-X parameters also enable the requesting device to specify in advance the specific number of bytes requested, thus eliminating the inefficiency of prefetches. Additionally, PCI-X bus logic permits a requestor to specify the ordering of the transactions. Previously, ordering requirements were not specific to read completion transactions in PCI enabled devices. Although, PCI logic also governs general ordering rules, such as memory writes being retrieved and delivered to the requestor first, PCI enabled devices do not accommodate for the bypass of memory write transactions by read completion transactions. However, PCI-X specifications facilitate read completion transactions in bypassing the transaction order queues, even if there are memory write transactions outstanding.

Any device that requires a significant number of memory write transactions from the central processing unit potentially introduces performance degradations on other devices. There is a need for a technique for read completion transactions to bypass memory write transactions without disrupting the ordering rules maintained within the bridges. Thus, the relaxed ordering feature of the PCI-X logic results in significantly higher system performance, because relaxed ordering facilitate the bypass of memory write transactions by read completions.

The present invention may address one or more of the problems discussed above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method for bypassing a transaction order queue for PCI-X transactions. The present technique involves determining whether the transaction is subject to a relaxed ordering attribute. If the transaction is subject to relaxed ordering, then the present technique facilitates completion of the transaction by bypassing the transaction order queue. Thus, the present method enables a read completion transaction to bypass the transaction order queue if a relaxed ordering attribute is set accordingly.

BRIEF DESCRIPTION OF THE DRAWINGS

The foregoing and other advantages of the invention will become apparent upon reading the following detailed description and upon reference to the drawing in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
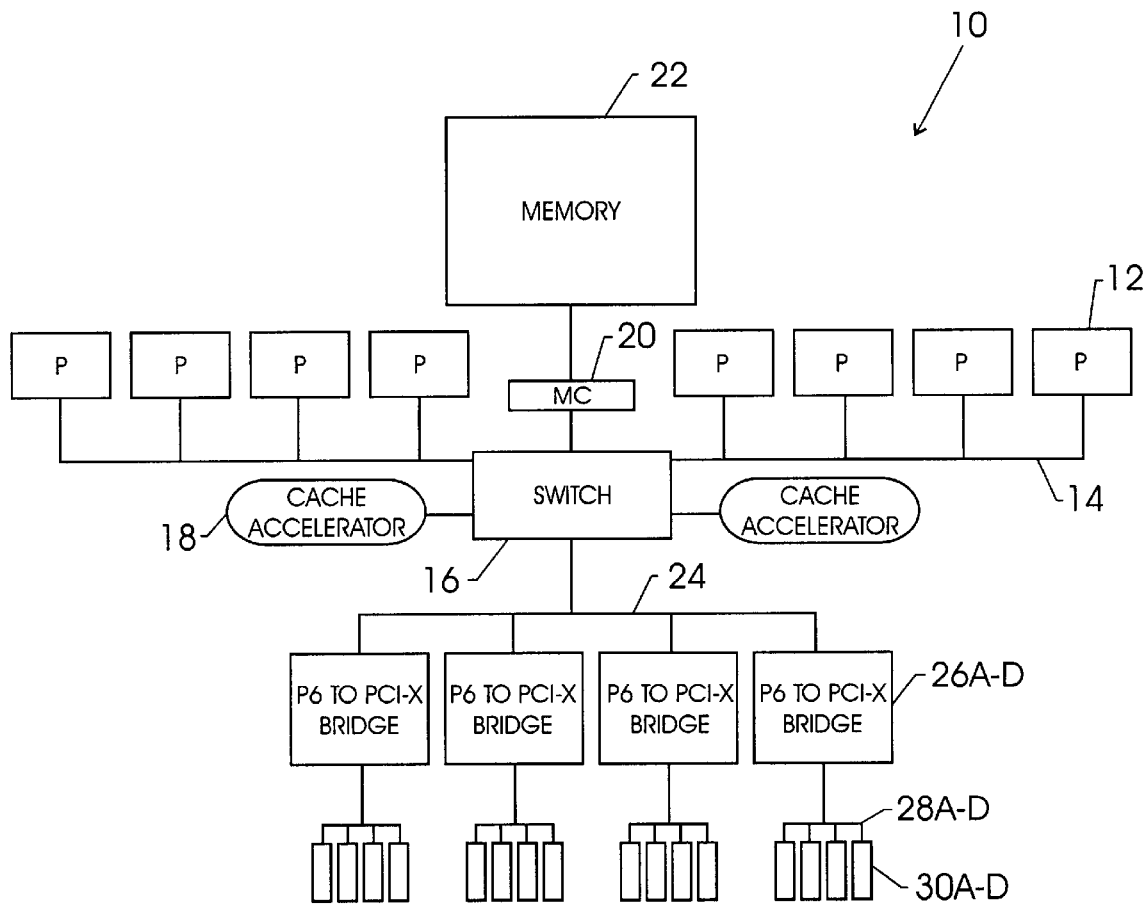
FIG. 1 illustrates a diagram of an exemplary computer system in accordance with the present invention.

Turning now to the drawings, and referring initially to FIG. 1, a multiprocessor computer system, for example a Proliant 8500 PCI-X from Compaq Computer Corporation, is illustrated and designated by the reference numeral 10. In this embodiment of the system 10, multiple processors 12 control many of the functions of the system 10. The processors 12 may be, for example, Pentium, Pentium Pro, or Pentium II Xeon (Slot-2) or Pentium III processors available from Intel Corporation. However, it should be understood that the number and type of processors are not critical to the technique described herein and are merely being provided by way of example.

Typically, processors 12 are coupled to a processor bus 14. As instructions are sent and received by the processors 12, the processor bus 14 transmits the instructions and data between the individual processors 12 and a switch 16. The switch 16 signals between the processor bus 14, cache accelerator 18, and a memory controller 20. A crossbar switch is shown in this embodiment, however, it should be noted that any suitable type of switch may be used in the operation of the system 10. When the data is retrieved from the memory 22, the instructions are sent via the memory controller 20. The memory controller 20 may be of any type suitable for such a system, such as, a Profusion memory controller. It should be understood that the number and type of memory, switches, memory controllers, and cache accelerators are not critical to the technique described herein, and are merely being provided by way of example.

The memory 22 in the system 10 is generally divided into groups of bytes called cachelines. Bytes in a cacheline may comprise several variable values. Cachelines in the memory 22 are moved to cache for use by the processors 12 when the processors 12 request one of the values stored in that particular cacheline.

The switch 16 is also coupled to an input/output (I/O) bus 24. As mentioned above the switch 16 directs data to and from the processors 12 through the processor bus 14, and either the cache accelerator 18 or the memory 22 though the use of the memory controller 20. In addition, data may be sent through the I/O bus 24 to multiple PCI-X bridges 26 A–D. The I/O bus 24 in this embodiment is shown coupled to PCI-X bridges 26 A–D. Further, each PCI-X bridge 26 A–D is coupled to multiple PCI-X buses 28 A–D. Finally, each PCI-X bus 28 A–D terminates at a series of slots or I/O interfaces 30 A–D.

The PCI-X bridges 26 A–D contain logic that processes input/output transactions. Generally, each of the PCI-X bridges 26 A–D is an application specific integrated circuit (ASIC). The PCI-X bridges 26 A–D may include address and data buffers, as well as arbitration and bus master control logic for the PCI-X buses 28 A–D. The PCI-X bridges 26 A–D may also include miscellaneous logic, such as counters and timers as conventionally present in personal computer systems, for example an interrupt controller for both the PCI and I/O buses, and power management logic.

As mentioned above, generally a transaction is initiated by a requester, e.g., a peripheral device, coupled to one of the I/O interfaces 30 A–D. The transaction is then sent to one of the PCI-X buses 28 A–D depending on the peripheral device utilized and the location of the I/O interface 30 A–D. The transaction is then directed towards the PCI-X bridge 26 A–D. Logic devices within the bridge 26 A–D generally allocate a buffer where data returned from the memory 22 may be stored. Once a buffer is allocated, the transaction is directed towards the processor 12 and then to the memory 22. Once the data is returned from the memory 22, the data is stored within the respective bridge 26 A–D. Specifically, the data is stored in the buffer. The logic within the bridge 26 A–D operates to read and deliver the data to the requesting peripheral device. However, if the transaction is conducted through a peripheral device (not shown) that does not have PCI-X capabilities, the PCI-X buses 28 A–D and the PCI-X bridges 26 A–D operate according to PCI specifications. Tape drives, CD-ROM devices, or other peripheral storage devices (not shown) may be connected to the slots or I/O interfaces 30 A–D. As mentioned above, the bridge 26 A–D contains an ASIC chip that contains logic that operates many of the functions described here. For instance, logic programmed within the ASIC chip controls the buffer read function. Furthermore, the ASIC chip may also contain logic specifying ordering rules, buffer allocation, specifying transaction type, and logic for receiving and delivering data.

Figure 2:
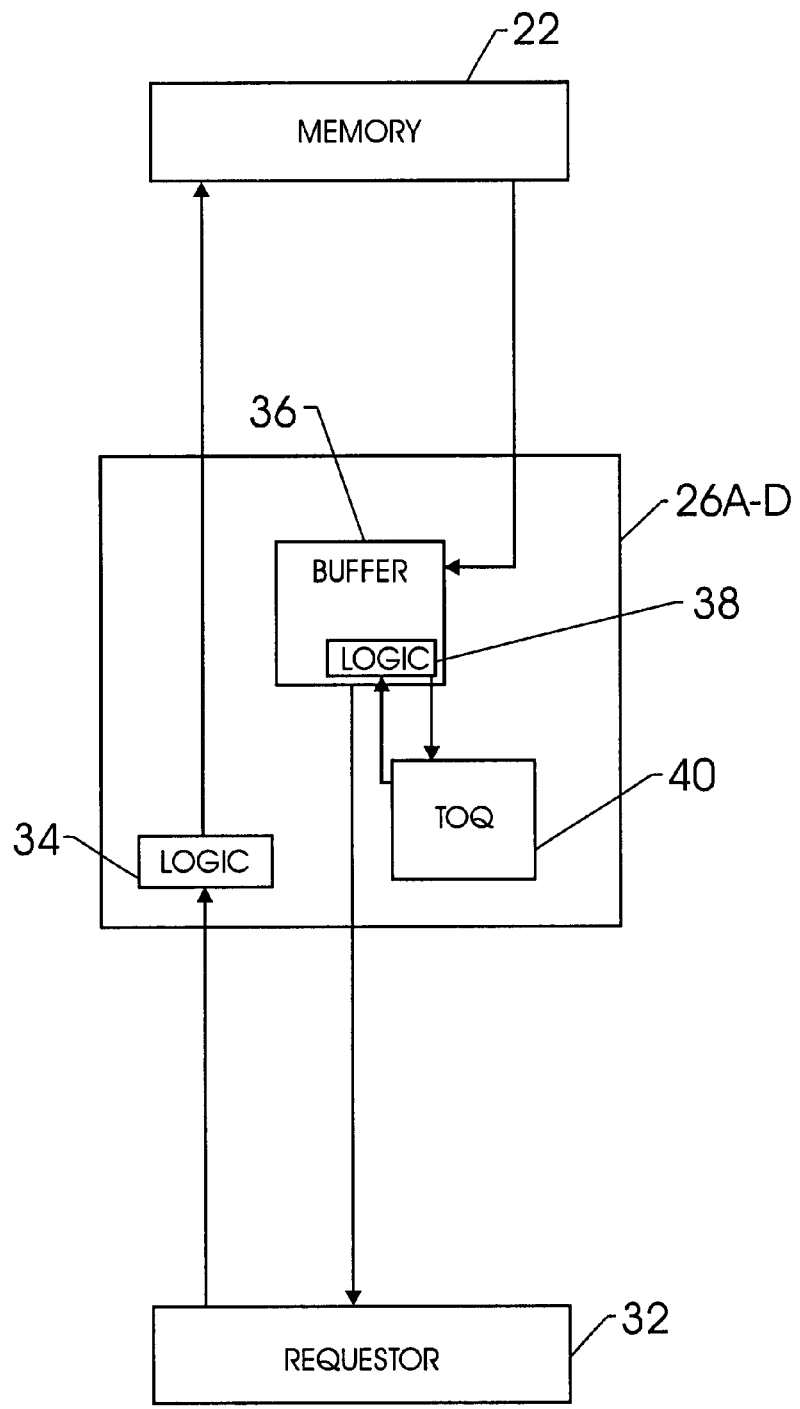
FIG. 2 illustrates a block diagram of a bridge incorporating exemplary elements for implementing relaxed ordering.

FIG. 2 illustrates a system diagram of a bridge containing logic for implementing a relaxed ordering attribute. As mentioned above, the bridges 26 A–D receive inputs from a requestor 32 through a peripheral device coupled to an PO Interface 30 A–D. The input is received by a logic device 34 within the bridge 26 A–D. It should be noted that the logic devices depicted in FIG. 2 may be incorporated within the single bridge ASIC. The logic device 34 receives the inputs from the requestor 32 and transmits the transaction to the memory 22. Additional information may also be saved by the logic device 34 within the bridge 26 A–D. The logic device 34 determines whether a PCI-X transaction is initiated and transmits the relaxed ordering attribute to a buffer 36, which is allocated to the transaction. It should be further noted that the functions of the logic device 34 may vary according to the type of transaction received.

The buffer 36 stores the relaxed ordering attribute for the transaction as the transaction is being processed and as data is being retrieved from the memory 22. Once the data is retrieved from the memory 22 and stored in the buffer 36, a logic device 38 determines whether the data is transmitted to the requesting device by bypassing the transaction order queue 40 or storing the data in the buffer 36 until the transaction is dequeued from the transaction order queue 40. It should be noted that if the relaxed ordering attribute is at a logical zero, the buffer 36 may enqueue an entry into the transaction order queue 40. Logic device 38 checks the saved relaxed order attribute, and if the attribute is set to a logical one, then the logic device 38 facilitates the buffer in delivering the transaction to the requesting device by bypassing the transaction order queue 40. Additional features may be incorporated within logic device 38, for instance the logic device 38 may be adapted to save the relaxed ordering attribute rather than saving the attribute setting within the buffer 36. Although, the logic device 38 is shown within the buffer, the logic device 38 may be located anyplace within the bridge 26 A–D provide similar results. Thus, it should be noted that the functionality of the logic devices depicted may vary depending on the type of transaction. For instance, alternate ordering scenarios may be initiated for transactions such as delayed/split completions and interrupt commands.

Figure 3:
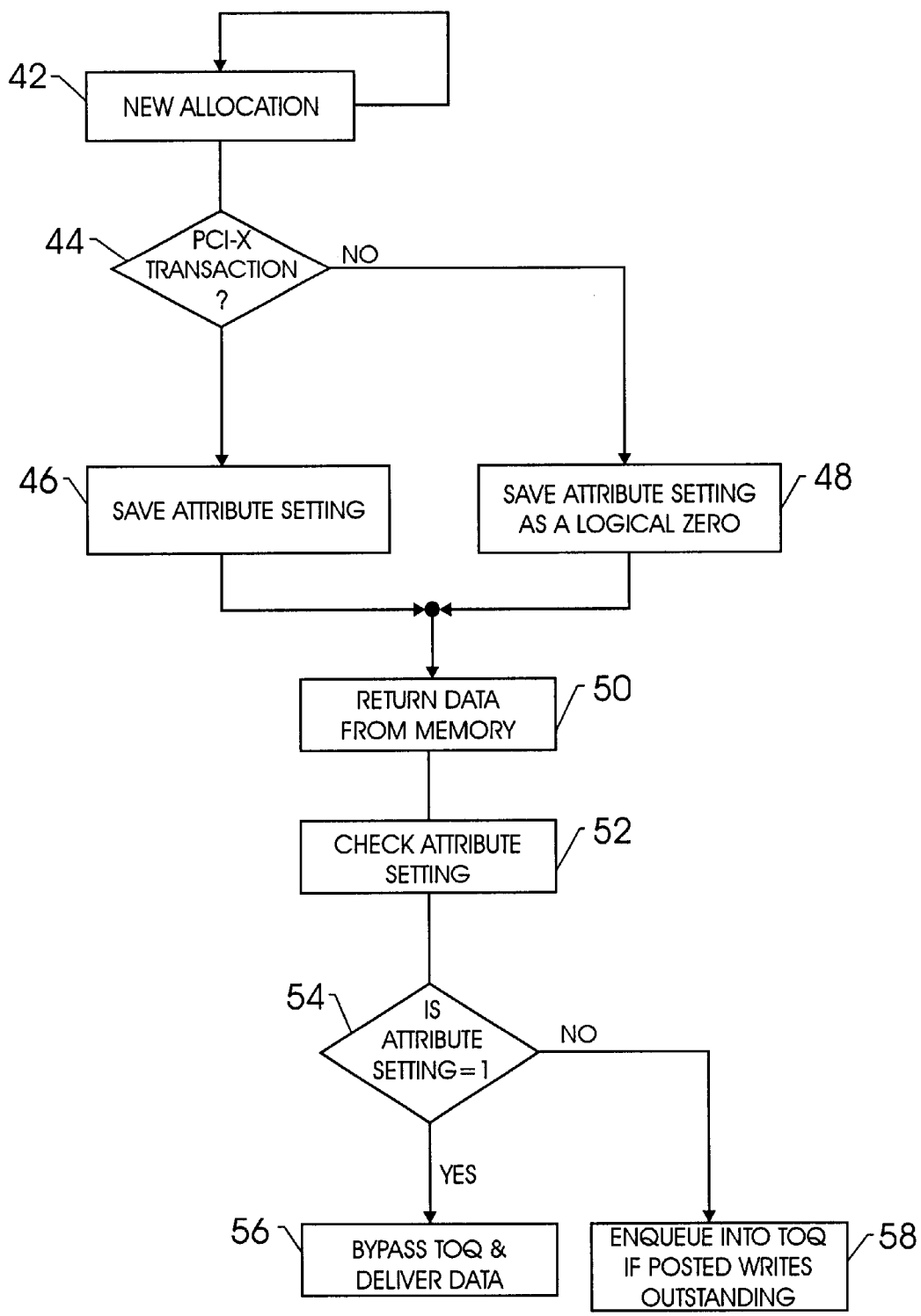
FIG. 3 illustrates a flowchart representing the steps for implementing relaxed ordering.

FIG. 3 illustrates a flowchart representing steps for the implementation of relaxed ordering attribute. Generally, a requestor initiates the transaction and also sets a relaxed ordering attribute for read completion transactions. Once the relaxed ordering attribute is set, e.g. to a logical one, a transaction is initiated within the system 10 at the I/O interface 30 A–D. It should be noted that the relaxed ordering attribute setting corresponds to read completions. The relaxed ordering mechanism may not be operative or suitable for all types of transactions. Currently, PCI-X specifications allow read completion transaction to bypass a memory write by utilizing the relaxed ordering attribute. However, even if a PCI-X read request transaction is initiated, the relaxed ordering attribute need not be set. For instance, the requestor may not set the relaxed ordering attribute for the read request transaction, thereby not utilizing the relaxed ordering mechanism for the transaction. Thus, when the requestor does not set an attribute or when the transaction is governed by PCI parameters, logic devices within the bridge 26 A–D will automatically set the relaxed ordering attribute to a logical zero.

As mentioned above, the transaction enters the bridge 26 A–D, and logic devices within the bridge 26 A–D check whether the transaction utilizes a new buffer allocation (step 42). If the transaction is not a new allocation, then the bridge 26 A–D waits for the next transaction (step 42). However, if the transaction utilizes a new allocation, the logic devices within the bridge 26 A–D determine whether the transaction is a PCI-X transaction (step 44). The relaxed attribute setting is saved for the transaction regardless of whether a PCI-X transaction is involved (step 46 & 48). If the transaction is a PCI-X transaction, the attribute is set at the option of the requestor.

As mentioned above, a buffer 36 is allocated at the time when the logic device 34 as shown in FIG. 2 determines that a buffer allocation may be utilized. The buffer is allocated regardless of the type of transaction initiated. For instance, any type of transaction may be allocated a buffer. If a PCI-X transaction is involved, then the bridge 26 A–D saves the relaxed ordering attribute setting as given by the requestor (step 46). However, if the transaction is not controlled by PCI-X specifications, then the bridge 26 A–D saves the relaxed attribute setting as a logical zero (step 48). Once the logic device 34 designates an attribute setting for the transaction, the transaction is directed to the processors 12 via the switch 16 and the bus 24.

Once the requested data is retrieved from the memory (step 50), the data is delivered to the bridge 26 A–D. At the bridge 26 A–D, the data is placed in the allocated buffer. At the time the data is returned to the bridge 26 A–D, the logic device 38, as shown in FIG. 2, determines the relaxed ordering attribute setting for the transaction (step 52). If the attribute is set at a logical one (step 54), then the transaction bypasses the transaction order queue and the buffer 36 delivers the data to the requester (step 56). However, if the relaxed ordering attribute of the read completion is set to a logical zero for a PCI-X transaction and if posted write transactions are outstanding, thena transaction entry is enqueued into the transaction order queue (step 58). If the transaction was determined to be a PCI transaction, wherein the bridge 26 A–D administers a logical setting of zero, then a transaction entry for that specific transaction is enqueued into the transaction order queue if posted write transactions are outstanding (step 58). Thus, regardless of whether the transaction is PCI or PCI-X, if the relaxed ordering attribute is a logical zero, then the transaction entry is enqueued into the transaction order queue if there are posted write transactions outstanding. The transaction entry is temporarily stored in the transaction order queue, until it is prioritized and dequeued. In the alternative, if there are no outstanding posted write transactions, the read completion transaction may bypass the transaction order queue, even though the relaxed ordering attribute is set at a logical zero.

Figure 4:
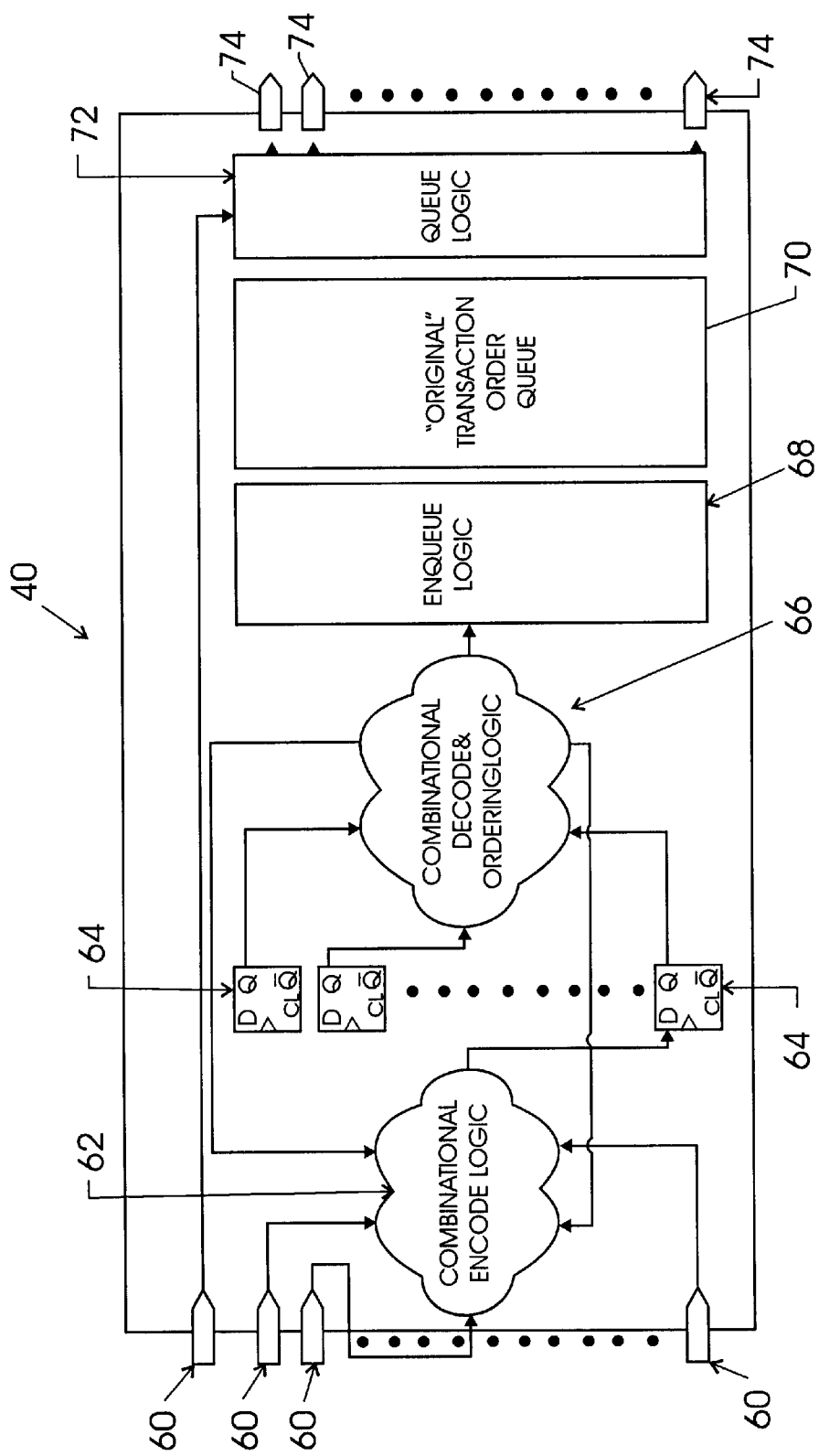
FIG. 4 illustrates an enhanced transaction order queue utilized in one exemplary embodiment.

FIG. 4 illustrates a system diagram depicting logic devices in an enhanced transaction order queue (TOQ) 40. This enhanced TOQ 40 is the subject of a co-pending application entitled "Enhancement to a Transaction Order Queue." Since this enhanced TOQ may be used in the present system, it will be described below. However, it should be understood that the present system may also operate with a more traditional TOQ as well.

In this particular embodiment, transaction entries 60 may be directed to an enhanced transaction order queue 40, wherein the transaction entries 60 are specifically directed towards a combinational encode logic device 62. The combinational encode device 62 processes the transactions by encoding the entries 60, and more specifically encoding the entries 60 according to PCI-X specifications, if the transaction was initiated by a PCI-X enabled device. Once the entries 60 are ordered within the combinational encode device 62, the transaction entries 60 are directed toward a plurality of registers 64. The registers 64 may be of any type that can store multiple entries 60. It should be noted that these registers do not maintain ordering information, but rather store the type of transaction being initiated, for example, read completion, posted write, and delayed/split transaction. Next, the combinational decode and ordering device 66 receives the entries 60 from the registers 64 and prioritizes the transaction requests according to PCI-X ordering rules. It should be noted that as the entries are delivered to the combinational decode and ordering logic device 66, logic device 62 checks the registers 64 and transmits the next entry into the register. The combinational decode and ordering device 66 submits the entries 60 according to priority and ordering rules via a logic device 68 for enqueuing to the "original" transaction order queue 70, which is essentially a conventional TOQ. Once the "original" transaction order queue 70 processes the transaction entry, the prioritized transaction entry is delivered to logic device 72 for dequeuing. The logic device 72 for dequeuing delivers the requested information or output 74 to the buffer 36. The buffer 36 then delivers the data to the requestor device via bus 28 A–D and interface slots 30 A–D. Thus, the ordering rules are maintained and the PCI-X transaction is completed.

It should be understood that the transaction entry is inputted into the transaction order queue and generally consists of five bits, where two bits identify the type of transaction and the additional three bits identify the location of the transaction data within the buffer 36. However, the transaction entry may consist of additional information regarding the type of transaction. For example, a read completion transaction entry generally consists of more than five bits.

It should be further noted that the combinational encode device 62 and the combinational decode and ordering device 66 may be fabricated as part of the application specific integrated circuit in which the transaction order queue functions within. The logic devices that compose the enhancement to the transaction order queue may be placed in a module containing the "original" transaction order queue 70. It should be also noted that the enhancement to the transaction order queue as illustrated in FIG. 2, is one specific embodiment. Therefore, the present invention may be maintained without certain components such as logic devices 62 and 66 as well as registers 64. Thus, the present invention is operative with the use of any suitable type of transaction order queue.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for bypassing a transaction order queue comprising the acts of:
    a) determining whether a transaction is a PCI-X transaction;
    b) if the transaction is a PCI-X transaction, determining whether the transaction is subject to relaxed ordering; and
    c) if the transaction is subject to relaxed ordering, completing the transaction while bypassing the transaction order queue.

2. The method as recited in claim 1, wherein the transaction is a read request transaction.

3. The method as recited in claim 1, wherein act (b) comprises determining whether a requester indicated relaxed ordering.

4. The method as recited in claim 1, wherein act (b) comprises setting a relaxed ordering attribute to a first predetermined value, if the transaction is subject to relaxed ordering.

5. The method as recited in claim 4, wherein act (b) comprises setting the relaxed ordering attribute to a second predetermined value different from the first predetermined value, if the transaction is not a PCI-X transaction.

6. The method as recited in claim 5, wherein the first predetermined value is a logical one, and the second predetermined value is a logical zero.

7. The method as recited in claim 1, wherein a transaction entry is enqueued into the transaction order queue if a posted write transaction is outstanding.

8. A method for bypassing a transaction order queue for read completion transaction, the method comprising the acts of:
    a) allocating a buffer for a transaction;
    b) storing a relaxed ordering attribute provided by the transaction;
    c) reading data into the buffer;
    d) retrieving the relaxed ordering attribute; and
    e) bypassing the transaction order queue, if the relaxed ordering attribute is set to a predetermined value.

9. The method as recited in claim 8, wherein act (a) comprises the act of determining whether the transaction is a PCI-X transaction.

10. The method as recited in claim 8, wherein act (b) comprises the act of storing the relaxed ordering attribute as a logical zero if the transaction is not PCI-X enabled.

11. The method as recited in claim 8, wherein act (e) comprises the act of bypassing the transaction order queue if the relaxed ordering attribute is set to a logical one.

12. The method as recited in claim 8, wherein act (e) comprises queuing the transaction into the transaction order queue if the relaxed ordering attribute is a logical zero.

13. A system for bypassing a transaction order queue comprising:
    means for determining whether a transaction is a PCI-X transaction;
    means for determining whether the transaction is subject to relaxed ordering, if the transaction is a PCI-X transaction; and
    means for completing the transaction while bypassing the transaction order queue, if the transaction is subject to relaxed ordering.

14. The system as in claim 13, wherein the means for determining whether a transaction is a PCI-X transaction comprises means for determining whether the transaction is a read request transaction.

15. The system as in claim 13, wherein the means for determining whether the transaction is subject to relaxed ordering comprises means for determining whether a requestor requested relaxed ordering.

16. The system as in claim 13, wherein the means for determining whether the transaction is subject to relaxed ordering comprises means for setting a relaxed ordering attribute to a first predetermined value, if the transaction is a PCI-X transaction.

17. The system as in claim 16, wherein the setting means comprises means for setting the relaxed ordering attribute to a second predetermined value different from the first predetermined value, if the transaction is not a PCI-X transaction.

18. The system as in claim 17, wherein the first predetermined value equals a logical one, the second predetermined value equals a logical zero.

19. A logic device for processing PCI-X transactions, the logic device comprising:
- at least one buffer;
- a logic circuit adapted to communicate with the buffer, the logic circuit designating a relaxed ordering attribute for read request transactions; and
- a transaction order queue adapted to communicate with the logic circuit and the buffer, the logic circuit causing the transaction to bypass the transaction order queue from the buffer depending on the relaxed ordering attribute setting.

20. The logic device as in claim 19, wherein the logic device is coupled to a memory and a plurality of processors via buses.

21. The logic device as in claim 19, wherein the logic device is coupled to a requestor de vice via buses.

22. The logic device as in claim 19, wherein the buffer is adapted to store data retrieved from the memory.

23. The logic device as in claim 19, wherein the buffer stores the relaxed attribute setting for the transaction.

24. The logic device as in claim 19, wherein the logic circuit is positioned within a bridge.

25. The logic device as in claim 19, wherein the logic circuit designates a relaxed ordering attribute to a first predetermined value, if the transaction is a PCI-X transaction.

26. The logic device as in claim 25, wherein the logic circuit designates a relaxed ordering attribute to a second predetermined value different from the first predetermined value, if the transaction is not a PCI-X transaction.

27. The logic device as in claim 25, wherein the first predetermined value equals a logical one, the second predetermined value equals a logical zero.

28. The logical device as in claim 19, wherein the logic circuit inputs an entry into the transaction order queue, if the relaxed ordering attribute is designated a logical zero.

29. The logical device as in claim 19, wherein the read request transaction bypasses the transaction order queue, if the relaxed ordering attribute is designated a logical one.

30. The logical device as in claim 19, wherein the transaction order queue enqueues an entry received from the buffer, if the relaxed ordering is designated a logical zero.

31. A computer system comprising:
- at least one processor;
- a memory device coupled to the at least one processor;
- transaction order queue circuit configured to process transaction entries from the memory device, the transaction order queue circuit adapted to enqueue and dequeue the transaction entry; and
- a logic circuit configured to process data from the memory device, the logic circuit being adapted to facilitate read completion transactions to bypass the transaction order queue depending on a relaxed ordering attribute, the relaxed ordering attribute stored by the logic circuit within a buffer.

32. The system as in claim 31, wherein a requestor sets the relaxed ordering attribute for the read request transaction.

33. The system as in claim 31, wherein the logic circuit is adapted to communicate with the memory and at least one of the processors.

34. The system as in claim 31, wherein the logic circuit designates a relaxed ordering attribute to a first predetermined value.

35. The system as in claim 34, wherein the logic circuit designates a related ordering attribute to a second predetermined value different from the first predetermined value.

36. The system as in claim 35, wherein the first predetermined value is a logical one and the second predetermined value is a logical zero.

37. The system as in claim 31, wherein the logic circuit stores the data processed in the memory device in a buffer.

38. The system as in claim 31, wherein the transaction entry is transmitted to the transaction order queue if the saved relaxed ordering attribute is a logical zero.

39. The system as in claim 32, wherein the data is transmitted directly to the requestor bypassing the transaction order queue, if the saved relaxed ordering attribute is a logical one.

* * * * *